July 31, 1928.                                          1,678,778
H. HARTER
APPARATUS FOR CARRYING OUT CHEMICAL REACTIONS BETWEEN
GASES OR VAPORS, OR GASES AND VAPORS
Filed July 27, 1926
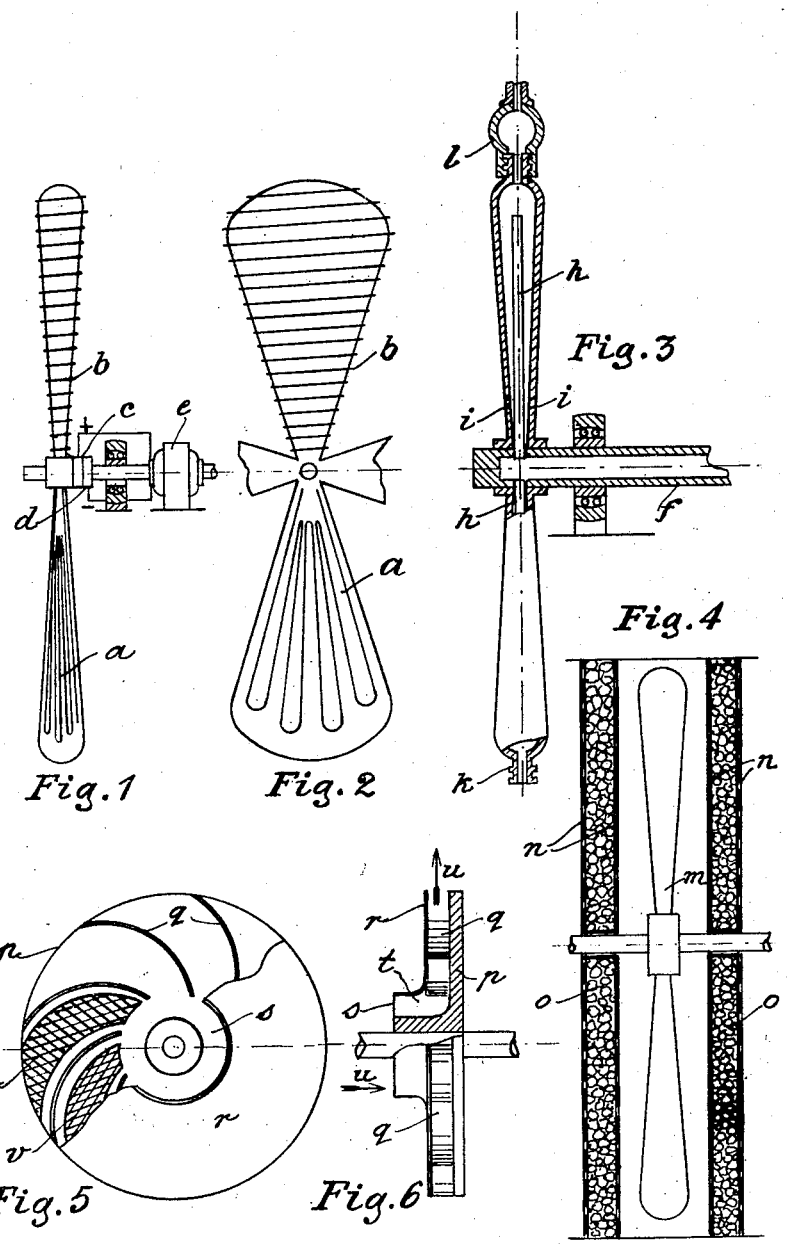

Patented July 31, 1928.

1,678,778

UNITED STATES PATENT OFFICE.

HANS HARTER, OF WURZBURG, GERMANY.

APPARATUS FOR CARRYING OUT CHEMICAL REACTIONS BETWEEN GASES OR VAPORS, OR GASES AND VAPORS.

Application filed July 27, 1926, Serial No. 125,306, and in Germany March 5, 1925.

This invention relates to apparatus for carrying out chemical reactions between gases or vapors, or gases and vapors, more especially for catalytic reactions of this kind.

Hitherto many of these reactions could not be carried through on an industrial scale, because the main conditions: high efficiency of the catalyst employed, high gas velocity, and rapid removal of the reaction products out of the reaction zone could not be fulfilled at the same time.

The object of my present invention is to provide for apparatus which enable me to fulfill the said conditions in a satisfactory way. For this purpose the gases or vapors under treatment are aspirated from one or more containers, either mixed or singly, with the aid of a rotary wheel provided with blades, a propeller or impeller or fan or the like mechanism. In case of catalytic reactions the said rotary wheel may contain or may consist of a catalytic material, whereby the gas current or currents are subdivided and the contact surface will be increased to an extent never attained by means of stationary catalysts. Owing to the increased efficiency of the apparatus, not only a great number of catalytic processes can now be carried out on an industrial scale with reasonable profit, but also the lucrativeness of those gas-processes, which are already profitably carried out on an industrial scale, may be considerably increased by employing my improved apparatus.

This is, in the first instance, due to the fact that with my improved apparatus not only the operative surface of the catalysts is extraordinarily increased, but also the reaction products are most rapidly removed from the reaction zone and the reaction gases can be mixed intimately and readily heated or cooled.

The blades or paddles of the rotary wheel or the like are, according to my invention, constructed in such a manner that they either themselves form or carry the catalysts, and, at the same time, serve to heat or to cool the catalysts, if desired. If the catalysts are or can be produced in the form of wire or in some other ductile form, the blades or paddles may be made of the catalytic material itself. This will always be suitable when the catalyst needs only be heated for starting the reaction and the latter is then maintained by the reaction heat itself, or when the catalysts can be continuously heated by an electric current. In the other case, the blades may be made of a conductor or non-conductor of heat or electricity, according to whether the catalyst is to be heated by burning gas or by means of electricity In this case the catalysts, if employed in the form of wire, net-work or spirals, are mounted on the blades of the rotary wheel, or if they are present in the form of powder or lumps, the same are arranged in hollow spaces of the blades. For heating the catalysts mounted on the blades of the rotary wheel, the blades may also be made hollow and the heating gas may be burned within the hollow spaces. The waste gases may be conducted away by an annular tube arranged at the end of the blades and connected with the blades by a sliding joint, as more particularly described below and shown in the drawings. The said hollow spaces may also serve for cooling the catalysts with air or water or the like. In this case the blades may also be used for carrying the catalysts which may be deposited in any known manner, for instance by means of the well-known metal-squirting process.

The efficiency of the catalyst which, besides its chemical composition, depends substantially upon its physical properties, especially upon the relation of surface to mass, may, by employing my new apparatus, be improved to the utmost degree. By correspondingly choosing the speed of the rotary wheel one is able to bring about the contact between the catalyst and the gases under treatment as many times as the gases are divided by the blades of the wheel. In this manner the gases may be brought into contact with the catalysts many times more than with stationary catalysts. Consequently, the gas velocity may be by far greater than with the known processes, so that the "space-time-output" will be by far increased. With my new apparatus the supply of gas is controlled in a most simple manner by suitably adjusting the position of the blades. According as the latter are disposed in a more or less acute angle, greater or fewer quantities of gas are aspirated.

Furthermore, with my improved apparatus also the third of the above mentioned conditions, which is indispensable in connection with a great number of gas-reactions, is fulfilled in an ideal manner. This condition is the rapid removal of the reaction products from the reaction zone. The reaction products will be removed from the sphere of the catalysts with the same velocity with which the rotary wheel aspirates the gases under treatment.

Should the reaction not be complete after one passage through the rotating wheel, there is nothing to hinder the connecting of a number of similar apparatuses in series.

With my improved apparatus, gas reactions may be carried out with or without pressure. In the latter case, the catalytic apparatus may be enclosed in the respective receptacles such as autoclaves, pressure-pipes, pressure-cylinders or the like. With gas reactions proceeding without a catalyst the blades may serve for heating the gases under treatment.

With my improved apparatus a great number of oxidation and reduction processes may be carried into practice. Of such processses the oxidation of ammonia, and the apparatus employed for this purpose may be described, by way of example, with reference to the annexed drawings of which Fig. 1 is a side elevation and Fig. 2 is a front view of a propeller provided with means for electric heating.

Fig. 3 illustrates in axial section a hollow propeller provided with internal gas heating.

Fig. 4 shows a propeller between two perforated double walls filled with catalysts.

Fig. 5 is a front view, and Fig. 6 a side elevation, partially in section, of a fan filled with a catalyst.

As platinum has proved to be the best catalyst for oxidizing ammonia, the blades of the fan may consist in this case of platinum itself. They may be made of corrugated or undulated sheet platinum or of platinum net-work or spirals. For producing the reaction-temperature the catalyst may be heated by a blow-pipe or made the conductor of an electric current. On the other hand, the blades may be made of an insulating material and the platinum forming the catalyst may be secured to it in the form of wire or net-work, as shown in Figs. 1 and 2. In this case the wire may be arranged upon the blades in loops $a$, or the blades may be surrounded by coils $b$. The ends of the wires are conducted to two slide-rings $c$, $d$, which are connected with a source of electricity for instance, in series with an electromotor $e$.

In Fig. 3 hollow blades, of iron, for instance, are employed, which are heated from the interior by means of gas. For this purpose, the hollow shaft $f$ is connected to a gas conduct through a labyrinth joint (not shown), and perforated pipes $h$, $h$ in the interior of the blades communicate with the boring of the shaft $f$. Combustion air may be sucked in through holes $i$, $i$. The flames burn out of the perforations of the pipes $h$, $h$, and the combustion gases escape through a labyrinth joint formed by a ring $k$ and an annular tube $l$.

When catalysts in the form of powder or lumps are to be employed, the construction shown in Fig. 4 may be used. The propeller $m$ is placed between two perforated double walls $n$, $n$, the space between which is filled with the catalyst $o$, for instance in the form of lumps. Either the propeller or the catalyst may be heated.

Figs. 5 and 6 illustrate another construction. A rotary disc $p$ is provided with blades $q$ which are closed by a cover $r$ leaving an annular opening $s$. (The cover $r$ in Fig. 5 is shown partially broken away.) In this way passages $t$ are formed, through which the centrifugal force drives the gases in the direction of the arrows $u$. Now these passages are filled with porous catalysts $v$ which are retained by wire-netting, perforated sheet metal or the like. The blades and walls may be likewise made of the catalyst itself if the latter consists of metal. After having been passed through the fan, the nitrous oxides formed by the oxidation of ammonia are cooled and absorbed in the well-known manner.

Whereas, hitherto, in the industrial manufacture of nitrous oxides by oxidation of ammonia, only small gas velocities were concerned, for instance of 6.6 m³ per minute in each element (see "Die Luftstickstoffindustrie" by Bruno Wäser, page 487), with my improved apparatus in an element having a tube diameter of say 20 inches and a gas velocity of 20 m. per second, 4 m³ of the mixture of ammonia and air per second can be treated, the contact surface of each element amounting to 2×20 dm². With a fan making 1200 revolutions per minute a contact surface of about 40×20=800 dm²=8 m² per second is obtained.

Furthermore my improved apparatus involves the considerable advantage that, for oxidizing ammonia, air instead of oxygen may be used. This was impossible with the processes hitherto known, because of the danger of explosions connected therewith. With my improved apparatus the oxidation of the ammonia is effected so rapidly that no explosion can occur.

In the same way as the oxidation of ammonia, a great number of similar processes between gases or vapors and air, oxygen, ozone, water vapor &c. may be carried out with my improved apparatus. As a further example, the production of formaldehyde from methane may be mentioned. Hitherto the output of this process was only small owing to the formaldehyde being liable to be decomposed to carbon monoxid and hydrogen at the temperatures required by the several catalysts. If, however, lower temperatures were used, the main part of the methane remained unchanged. Owing to the increased contact surface and the rapid removal of the formaldehyde out of the reaction zone the above mentioned drawbacks are wholly or greatly avoided. In this process copper or nickel wires or network or spirals may be employed, the blades of the rotary wheel being preferably made of the said metals; or copper or nickel catalysts in the form of powder or lumps may be used.

In the same manner formaldehyde may be produced from acetylene and oxygen, or from acetone.

Further catalytic processes which may advantageously be carried out according to my invention are: The production of acetic aldehyde or acetic acid from acetylene and steam or steam and oxygen or air; the production of hydrocyanic acid from carbon monoxid and ammonia in presence of catalytic substances; the production of amines from alcohol and ammonia, of methane from water gas, carbon monoxid and other carbonaceous gases; the production of cyanides from carbon monoxid, ammonia and hydrogen; the decomposition of hydrocarbons by steam to carbon dioxid and hydrogen, &c.

I claim:—

1. Apparatus for carrying out reactions between gases or vapors or gases and vapors comprising a propeller carrying a catalytic material and adapted to aspirate, subdivide and mix the said gases and vapors, means for supplying gases or vapors to the said propeller, and means for conducting away the reaction products.

2. Apparatus for carrying out reactions between gases or vapors or gases and vapors, comprising a catalytic propeller adapted to aspirate, subdivide, and mix the said gases and vapors, means for influencing the temperature of the said propeller, means for supplying gases or vapors to the said propeller, and means for conducting away the reaction products.

In testimony whereof I affix my signature.

HANS HARTER.